United States Patent [19]

Irwin et al.

[11] 4,049,303
[45] Sept. 20, 1977

[54] CABLE LOC WITH DIMPLE ALONG FIXED END OF CABLE TO ASSURE INTEGRITY OF SEAL

[75] Inventors: George Irwin, Fremont; Gary Butler, LaGrange, both of Ind.

[73] Assignee: Brammall, Inc., Angola, Ind.

[21] Appl. No.: 663,355

[22] Filed: Mar. 3, 1976

[51] Int. Cl.² .............................................. G09F 3/00
[52] U.S. Cl. .......................... 292/307 R; 24/115 H; 24/136 A
[58] Field of Search ................... 292/307 R, 316, 317, 292/307 A, 307 B, 315, 323, 325, 326; 339/276 T; 24/136 A, 115 H; 403/368; 70/49

[56] References Cited

U.S. PATENT DOCUMENTS 1,139,595  5/1915  Starr ................................. 24/136 A
3,770,307  11/1973  Van Gompel .................... 292/307 R

FOREIGN PATENT DOCUMENTS 454,224  6/1950  Italy ................................. 292/307 R Primary Examiner—Paul R. Gilliam
Assistant Examiner—Kenneth J. Dorner
Attorney, Agent, or Firm—Hill, Gross, Simpson, Van Santen, Steadman, Chiara & Simpson

[57] ABSTRACT

An improved Cable Loc Seal which includes a staking operation which locks the fixed end of the cable to the lock and furthermore, prevents the integrity of the seal from being destroyed in that if the cable is cut and the fixed end removed a new end of the cable cannot be inserted into the lock which guarantees the integrity of the seal.

3 Claims, 3 Drawing Figures

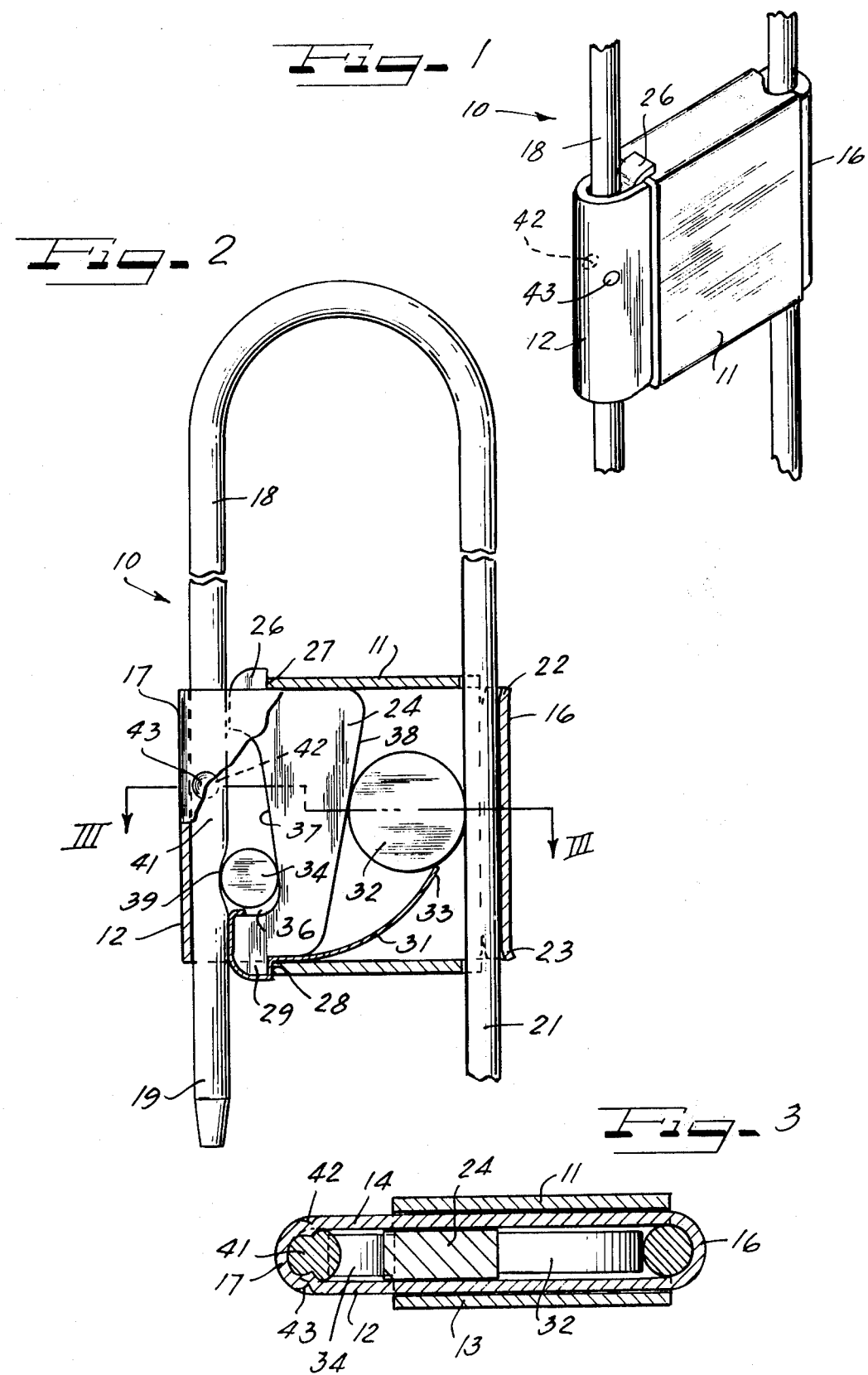

CABLE LOC WITH DIMPLE ALONG FIXED END OF CABLE TO ASSURE INTEGRITY OF SEAL

BACKGROUND OF THE INVENTION

1. Field of the Invention

This invention relates in general to a Cable Loc Seal and in particular to an improved locking device which includes a dimple formed in the device to shred the cable if it is removed to prevent it from being reinserted and thus to assure the integrity of the seal.

2. Description of the Prior Art

In prior art Cable locking devices, the cable has been cut or broken to destroy the seal and then after the seal has been broken the lock-cable connection has been re-established which destroys the integrity of the seal and makes it impossible to determine that the seal has been broken and rejoined.

SUMMARY OF THE INVENTION

The present invention provides a Cable Loc Seal wherein the fixed end of the cable is staked to the lock in a fashion such that if the cable is cut or broken the interior of the lock is shaped such that the old or a new cable cannot be inserted into the lock to re-establish the seal, thus preventing thieves from destroying the integrity of the lock.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the invention;

FIG. 2 is a sectional view taken through the invention; and

FIG. 3 is a sectional view taken on line III—III from FIG. 2.

DESCRIPTION OF THE PREFERRED EMBODIMENTS

The locking device 10 comprises a generally rectangular body member 11 through which a second body member 12 extends so as to provide a first opening 17 through which one end 19 of a cable 18 can be passed and a second opening 16 with flared ends 22 and 23 through which the second end 21 of the cable 18 can be passed. A cam member 24 is mounted within the body member 11 and has a projection 26 which bears against one end 27 of the body member 11 as shown in sectional view 2. The cam member 24 also has a projection 29 at its opposite end which bears against a spring 31 and an end 28 of the body member 11. The cam member 24 has a first inclined surface 37 upon which a disc 34 is mounted so as to bear against the cable 18 at point 39 so as to lock it to the body member. A second inclined surface 38 is formed on the cam member 24 and a larger disc member 32 bears against such inclined surface and is engaged by the end 33 of spring 31. In use the end 19 is attached to the body member 11 by dimples 42 and 43 as shown in sectional view 3 so as to lock the cable portion 41 to the body member 12 and the second end 21 of the cable is passed through hasps or other devices to be locked after which it is inserted into the flared opening 22 and out the opening 23. The end 21 can be pulled downwardly relative to FIG. 2 but cannot be pulled upwardly since the disc 32 will move up the inclined surface 38 and lock the cable 21 so that it cannot move upwardly out of the body member 11. This same action occurs on the opposite end of the lock. This disc 34 is what keeps the cable locked into the body of the lock.

The present invention provides the dimples 42 and 43 which are formed in the body member 12 after the end 19 of the cable 18 has been inserted through the body member 11 and the indentations 42 and 43 assure that the end 19 of the cable will not move relative to the body member and, furthermore, in the event that a thief breaks or cuts a cable 18 the end of the cable within the body member cannot be removed or if it is removed a new cable end cannot be inserted into the body member and locked by the disc 34 because the cable will be shredded and cannot be reinserted. Prior to this invention a thief could by hitting the unit at the right edge in FIG. 3 with a hammer while restraining the left ends of sides 11 and 12 loosen the cable end 19 from disc 34 and remove end 19 and steal goods protected by the device. Then the cable could be restrung through the lock. The dimples 42 and 43 of the present invention shred the cable so badly that restringing is impossible. This assures the integrity of the seal which has been made by the locking device such that the locking device cannot be broken or cut and the cable replaced with a portion of the old cable or with a new cable. This assures that when the lock is inspected the absence of the cable extending into the dimple opening formed by the dimples 42 and 43 will indicate that the lock has been tampered with and that the seal has been broken.

Prior to this invention, thieves have inserted a broken end of the cable into the locking device so as to relock it after the seal has been broken.

It is seen that this invention provides a new and novel locking device which assures the integrity of the seal and although it has been described with respect to preferred embodiments it is not to be so limited as changes and modifications may be made which are within the full intended scope of the invention as defined by the appended claims.

We claim as our invention:

1. A cable lock and seal device comprising,
   a body member with a pair of parallel orifices on opposite sides thereof,
   a cam member in said body member and formed with first and second inclined surfaces on opposite sides thereof,
   a spring means in said body member,
   a first disc mounted in said body member on one side and engageable with said spring member and said first inclined surface,
   a second disc mounted in said body member on the opposite side and engageable with said second inclined surface,
   a cable with a first end extending into one of said pair of orifices and held in said body member between said second disc and said body member,
   an indentation formed in said body member to lock said first end of said cable to said body member,
   the second end of said cable receivable into the other of said pair of orifices and locked against one direction motion between said first disc and said body member, and
   wherein said second disc and said indentation lock said one end of said cable to the body member to prevent it from moving in either direction relative to said body member.

2. A cable lock and seal device according to claim 1 wherein a second indentation is formed in said body member to lock said first end of said cable to said body member.

3. A cable lock and seal device according to claim 2 wherein said indentations are formed on opposite sides of said body member and are aligned with each other and extend into said one end of said cable.

* * * * *